US011912226B2

(12) United States Patent
Nagasawa (10) Patent No.: US 11,912,226 B2
(45) Date of Patent: Feb. 27, 2024

(54) AIRBAG DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/986,469

(22) Filed: Nov. 14, 2022

(65) Prior Publication Data

US 2023/0158991 A1 May 25, 2023

(30) Foreign Application Priority Data

Nov. 24, 2021 (JP) .................................. 2021-190139

(51) Int. Cl.
*B60R 21/21* (2011.01)
*B62D 25/02* (2006.01)
*B60R 21/015* (2006.01)

(52) U.S. Cl.
CPC ........ *B60R 21/21* (2013.01); *B60R 21/01508* (2014.10); *B62D 25/025* (2013.01)

(58) Field of Classification Search
CPC ........ B60R 21/36; B60R 21/21; B60R 21/233
See application file for complete search history.

(56) References Cited

U.S. PATENT DOCUMENTS

| 6,883,631 | B2 * | 4/2005 | Hu ......................... B60R 21/013 |
| | | | 180/274 |
| 7,806,221 | B2 * | 10/2010 | Mishra .................. B60R 21/013 |
| | | | 280/730.1 |
| 8,172,027 | B2 * | 5/2012 | Mishra .................. B60R 19/205 |
| | | | 280/730.1 |
| 9,452,666 | B1 * | 9/2016 | Suh ......................... B60R 19/42 |
| 10,434,970 | B2 * | 10/2019 | Saito ........................ B60R 21/21 |
| 10,589,705 | B2 * | 3/2020 | O'Connor ......... B60R 21/01512 |
| 11,072,307 | B1 * | 7/2021 | Baccouche ........... B60R 19/205 |
| 2003/0155750 | A1 * | 8/2003 | Hu ......................... B60R 21/013 |
| | | | 280/730.1 |

(Continued)

FOREIGN PATENT DOCUMENTS

| CN | 103158653 A | * | 6/2013 | ........... B60R 19/205 |
| CN | 113147656 A | * | 7/2021 | ......... B60R 21/0134 |

(Continued)

*Primary Examiner* — Nicole T Verley
(74) *Attorney, Agent, or Firm* — MCGINN I.P. LAW GROUP, PLLC.

(57) ABSTRACT

An airbag device for a vehicle provided with a door and a side sill includes an airbag and an application state detector. The airbag is deployed from a container to be disposed on a lower side of the door on a vehicle body to a region on a vehicle-widthwise outside of the door. The application state detector detects a load application state of a load from the airbag to the vehicle body. The airbag includes a first air chamber, a second air chamber, and an internal pressure controller. The first air chamber transmits a load applied from the vehicle-widthwise outside to a side surface of the side sill. The second air chamber couples a lower part of the first air chamber and the container. The internal pressure controller controls an internal pressure of the second air chamber based on the load application state detected by the application state detector.

16 Claims, 7 Drawing Sheets

(56) References Cited

U.S. PATENT DOCUMENTS

| | | | | |
|---|---|---|---|---|
| 2004/0049331 A1* | 3/2004 | Schneider | ............ | B60R 19/205 |
| | | | | 701/45 |
| 2016/0355152 A1* | 12/2016 | Perez Garcia | .......... | B60R 21/34 |
| 2017/0072775 A1* | 3/2017 | Kindaichi | ........... | B60R 21/0136 |

FOREIGN PATENT DOCUMENTS

| | | | | |
|---|---|---|---|---|
| DE | 10203287 A1 * | 8/2003 | ........... | B60R 21/013 |
| EP | 2894067 A1 * | 7/2015 | ............. | B60R 21/21 |
| EP | 3333022 A1 * | 6/2018 | ........... | B60R 5/0444 |
| JP | H061027 U * | 1/1994 | | |
| JP | 2005-349920 A | 12/2005 | | |
| JP | 2005-537165 A | 12/2005 | | |
| JP | 2005537165 A * | 12/2005 | | |
| JP | 4005255 B2 * | 11/2007 | ........... | B60R 19/483 |
| JP | 2008-526593 A | 7/2008 | | |
| JP | 2023039538 A * | 3/2023 | ............ | B60R 21/36 |
| WO | WO-03053748 A1 * | 7/2003 | ........... | B60R 19/205 |
| WO | WO-2005104904 A1 * | 11/2005 | ............ | A47C 27/082 |
| WO | WO-2015090582 A1 * | 6/2015 | ............ | B60R 21/21 |

\* cited by examiner

AIRBAG DEVICE

CROSS-REFERENCE TO RELATED APPLICATIONS

The present application claims priority from Japanese Patent Application No. 2021-190139 filed on Nov. 24, 2021, the entire contents of which are hereby incorporated by reference.

BACKGROUND

The disclosure relates to an airbag device including an airbag configured to be deployed outside a vehicle upon a side collision of the vehicle.

In a vehicle such as an automobile, use of an airbag device including an airbag to be deployed outside the vehicle has been proposed to reduce damage to a vehicle body and an occupant upon a collision.

As techniques related to measures against a side collision of a vehicle, for example, Japanese Unexamined Patent Application Publication (JP-A) No. 2005-349920 discloses an occupant protection device including: an internal airbag to be deployed into a curtain shape along a side window inside a vehicle upon detection of collision from a side of the vehicle; and an external airbag to be deployed along the side window outside the vehicle upon detection of collision from the side of the vehicle. JP-A No. 2005-349920 discloses that the internal airbag and the external airbag are deployed to finally overlap with the side of the vehicle.

Japanese Unexamined Patent Application Publication (Translation of PCT Application) (JP-T) No. 2005-537165 discloses an occupant protection system including an external airbag system and a predictive collision detection system. In the occupant protection system, to protect an occupant in response to collision, an airbag including air chambers arranged in a front-rear direction is deployed to the vehicle-widthwise outside from the inside of a door near the occupant's seated position.

JP-T No. 2008-526593 discloses that, as airbags that sequentially operate to alleviate damage to a vehicle upon collision, airbags including inflation units are arranged in a horizontal direction on, for example, a side surface of a vehicle body.

SUMMARY

An aspect of the disclosure provides an airbag device to be applied to a vehicle. The vehicle is provided with a door and a side sill. The door is provided to be openable and closable at a door opening provided on a side surface of a vehicle body of the vehicle. The side sill is disposed along a lower edge of the door. The airbag device includes an airbag and an application state detector. The airbag is configured to be deployed from a container to be disposed on a lower side of the door on the vehicle body to a region on a vehicle-widthwise outside of the door. The application state detector is configured to detect a load application state of a load from the airbag to the vehicle body. The airbag includes a first air chamber, a second air chamber, and an internal pressure controller. The first air chamber is configured to transmit a load applied from the vehicle-widthwise outside to a side surface of the side sill. The second air chamber is configured to couple a lower part of the first air chamber and the container. The internal pressure controller is configured to control an internal pressure of the second air chamber based on the load application state detected by the application state detector.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In a side collision in which an object, such as another vehicle, collides from a side of a vehicle, a crash stroke in which energy is absorbable by crush of a vehicle body structure is shorter than in a front collision, which can result in an insufficient amount of energy absorption.

Moreover, in a side collision, a deformation speed of a door during the collision can be faster than a movement speed of a vehicle body, which can cause secondary collision damage to an occupant.

In view of such circumstances, providing a vehicle outside airbag device to be deployed outside a vehicle on a side surface of a vehicle body has been proposed, as in the existing techniques described above. However, in a case where a load from an object that comes into collision is applied to a door via an airbag, it is eventually difficult to sufficiently suppress deformation of the door. What is desired is to more effectively suppress entry of the door into a vehicle compartment.

It is desirable to provide an airbag device that suppresses collision damage upon a side collision.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A description is given below of an airbag device according to a first example embodiment of the disclosure.

The airbag device according to the first example embodiment may be related to a vehicle, for example, an automobile such as a passenger car, provided with an occupant entry and exit door on a side surface of a vehicle compartment that accommodates an occupant.

Figure 1:
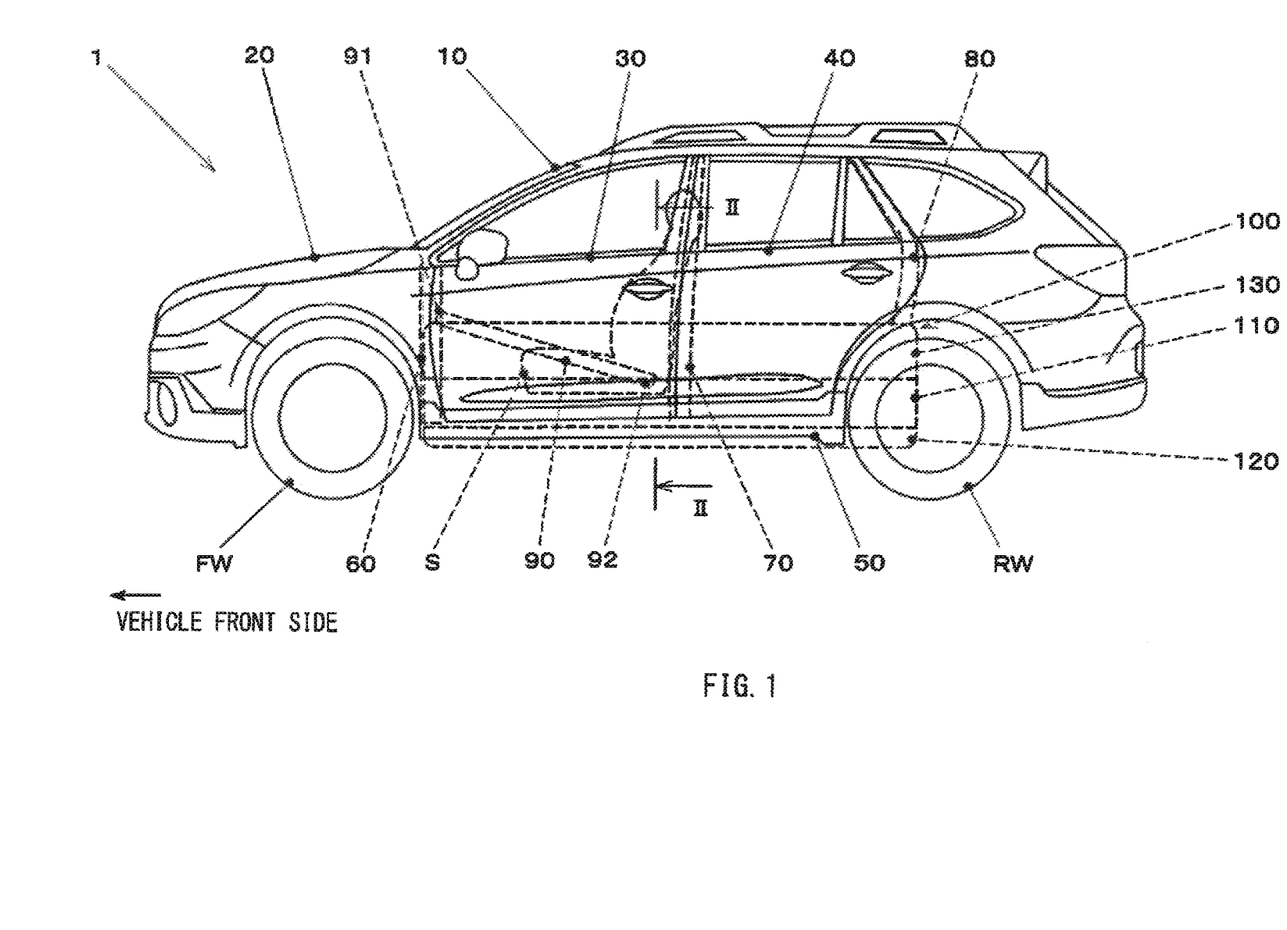
FIG. 1 is a side view of a vehicle including an airbag device according to one example embodiment of the disclosure.

FIG. 1 is a side view of the vehicle including the airbag device according to the first example embodiment.

Figure 2:
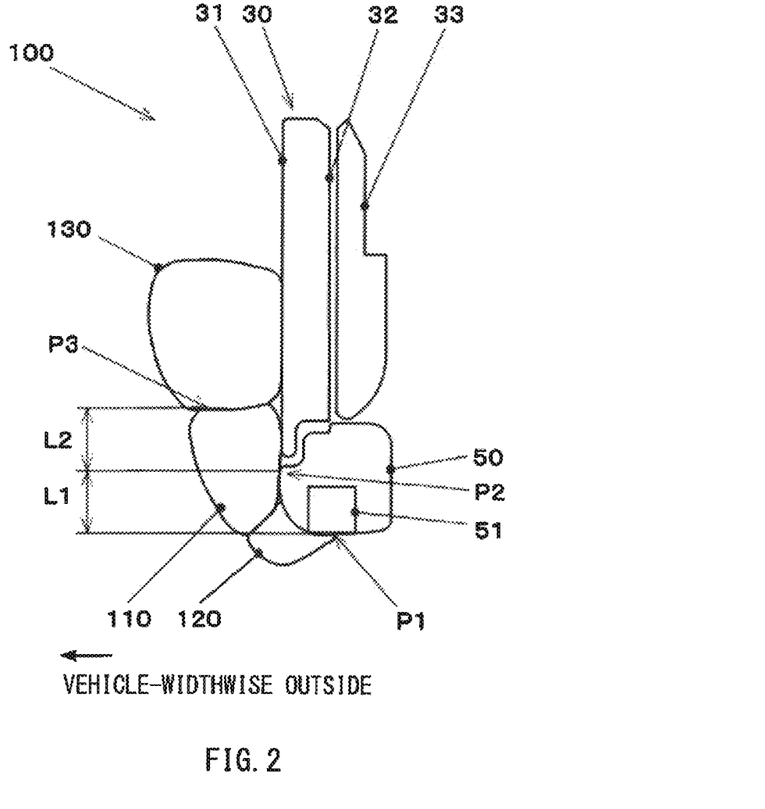
FIG. 2 is a cross-sectional view taken in a direction of arrows II-II illustrated in FIG. 1.

FIG. 2 is a cross-sectional view taken in a direction of arrows II-II illustrated in FIG. 1, In the first example embodiment, a vehicle 1 may be, for example, an automobile such as a passenger car with a so-called two-box vehicle shape that includes a power unit compartment 20 protruding to a front side of a vehicle compartment 10.

The vehicle compartment 10 may have a space that accommodates, for example, an occupant. The vehicle compartment 10 may include, for example, two rows of seats, i.e., front seats and rear seats, arranged in a front-rear direction.

A side surface of the vehicle compartment 10 may be provided with, for example, a front side door 30, a rear side door 40, a side sill 50, an A pillar 60, a B pillar 70, a C pillar 80, and a door beam 90.

The front side door 30 may be a door-shaped body that is used for a front-seat occupant to get in or get out of the vehicle. The front side door 30 may be provided to be openable and closable at a door opening provided on a side of a front seat S in a front part of the vehicle compartment 10.

The front side door 30 may have a front end swingably attached to a rear part of the A pillar 60 via an unillustrated hinge.

The front side door 30 may have a rear end detachably attached to a front part of the B pillar 70 via an unillustrated door catch mechanism.

As illustrated in FIG. 2, the front side door 30 may include, for example, an outer panel 31, an inner panel 32, and a door trim 33.

The outer panel 31 and the inner panel 32 may each be, for example, a steel plate press-worked into a panel-shaped member.

The outer panel 31 may be a member included in an outer surface, or a design surface, of the vehicle 1.

The inner panel 32 may be disposed on the vehicle-widthwise inside of the outer panel 31. The outer panel 31 and the inner panel 32 may be joined to each other at outer peripheral edges. In a middle part of the front side door 30, the outer panel 31 and the inner panel 32 may be opposed to each other with a space provided therebetween in a vehicle widthwise direction.

The inner panel 32 may be a frame-shaped member including a steel plate with a larger thickness than the outer panel 31 and having higher strength and bending stiffness than the outer panel 31.

The door trim 33 may be an interior member exposed to the inside of the vehicle compartment 10.

The door trim 33 may be attached to a surface of the inner panel 32 on the vehicle-widthwise inside.

The door trim 33 may include, for example, a resin-based material such as polypropylene (PP).

The rear side door 40 may be a door-shaped body that is used for a rear-seat occupant to get in or get out of the vehicle. The rear side door 40 may be provided to be openable and closable at a door opening provided on a side of an unillustrated rear seat in a rear part of the vehicle compartment 10.

A front edge of the rear side door 40 may be disposed adjacent to a rear edge of the front side door 30 via an inevitably provided space or gap, in a state in which the doors are closed.

The rear side door 40 may have a front end swingably attached to a rear part of the B pillar 70 via an unillustrated hinge.

The rear side door 40 may have a rear end detachably attached to a front part of the C pillar 80 via an unillustrated door catch mechanism.

The side sill 50 may be a vehicle body structural member extending in the front-rear direction of the vehicle, i.e., a vehicle front-rear direction, along lower edges of the front side door 30 and the rear side door 40.

The side sill 50 may be disposed along both ends of an unillustrated floor panel included in a floor surface of the vehicle compartment 10.

The side sill 50 may have a front end disposed adjacent to a rear part of a front wheel house containing a front wheel FW.

The side sill 50 may have a rear end disposed adjacent to a front part of a rear wheel house containing a rear wheel RW.

A lower part of the side sill 50 may be provided with a retainer 51 serving as a container that contains an airbag 100 in an undeployed state and an inflator 211.

The A pillar 60 may be a vehicle body structural member, i.e., a front pillar, provided to protrude upward from the vicinity of the front end of the side sill 50.

A lower part of the A pillar 60 may be disposed along the front end of the front side door 30.

The lower part of the A pillar 60 may be provided with the unillustrated hinge supporting the front side door 30 swingably about an axis extending along a vertical direction.

An upper part of the A pillar 60 may be exposed to be included in the outer surface of a vehicle body of the vehicle, and may be inclined rearward along a side edge of a windshield.

The B pillar 70 may be a vehicle body structural member, i.e., a center pillar, provided to protrude upward from an intermediate part of the side sill 50 in the front-rear direction.

The rear edge of the front side door 30 may be disposed along a front part of the B pillar 70.

The rear end of the front side door 30 may be detachably attached to the B pillar 70 via the unillustrated door catch mechanism.

The front edge of the rear side door 40 may be disposed along a rear part of the B pillar 70.

The rear part of the B pillar 70 may be provided with the unillustrated hinge supporting the rear side door 40 swingably about an axis extending along the vertical direction.

The C pillar 80 may be a vehicle body structural member, i.e., a rear pillar, provided to protrude upward from the vicinity of the rear end of the side sill 50.

A rear edge of the rear side door 40 may be disposed along a front part of the C pillar 80.

The rear end of the rear side door 40 may be detachably attached to the C pillar 80 via the unillustrated door catch mechanism.

The side sill 50, the A pillar 60, the B pillar 70, and the C pillar 80 may be, for example, steel plates press-formed into panels and assembled and joined by spot welding, laser welding, a structural adhesive, etc. to each have a closed section as a cross-section extending along a plane orthogonal to a longitudinal direction.

The door beam 90 may be a member provided inside the front side door 30 and disposed across a front part and a rear part of the front side door 30.

The door beam 90 may include, for example, a circular pipe including a steel material.

A front end 91 and a rear end 92 of the door beam 90 may be attached to the inner panel 32 in the vicinity of the front end and the rear end of the front side door 30.

The door beam 90 may be inclined with respect to a horizontal direction in such a manner that the front end 91 is positioned higher than the rear end 92.

The vehicle 1 may include the airbag 100 configured to be deployed to a region on the vehicle-widthwise outside of the front side door 30 and the rear side door 40, in response to a symptom of a side collision (pre-crash determination).

The airbag 100 may be, for example, base fabric panels including nylon fibers joined to each other into a bag-shaped body by a method such as stitching or fusion.

The airbag 100 may be deployed by receiving a deployment gas introduced from the inflator 211 to be described later.

In normal use of the vehicle, including before pre-crash determination establishment and before airbag deployment, the airbag 100 may be contained in a folded state in the retainer 51 provided in the lower part of the side sill 50.

The retainer 51 may serve as a part where the airbag 100 is attached on a vehicle body side after the airbag 100 is deployed.

As illustrated in FIG. 2 etc., the airbag 100 may include a first air chamber 110, a second air chamber 120, and a third air chamber 130.

The first air chamber 110 may be deployed on the vehicle-widthwise outside of the outer panel 31 and the side sill 50.

The first air chamber 110 may be configured to mainly transmit a load received from an object that comes into side collision to the side sill 50 and the front side door 30.

As illustrated in FIG. 2, a vertical distance L1 from a point P1 where the airbag 100 (the second air chamber 120) and the side sill 50 are fixed to each other to a point P2 where a side surface of the side sill 50 protrudes furthest to the vehicle-widthwise outside may be set equal to a vertical distance L2 from the point P2 to an upper end P3 of the first air chamber 110.

The second air chamber 120 is a part provided across a lower part of the first air chamber 110 and the retainer 51 of the side sill 50 and included in a lower part of the airbag 100.

The second air chamber 120 may serve as a base where the airbag 100 is attached to the vehicle body.

The second air chamber 120 may be configured to couple the first air chamber 110 and the side sill 50, and control a behavior of the first air chamber 110.

The control of the behavior of the first air chamber 110 by the second air chamber 120 will be described in detail later.

The third air chamber 130 may be a part configured to be deployed to protrude further to the upper side from an upper part of the first air chamber 110.

The third air chamber 130 may be provided with an unillustrated vent hole (vent channel).

The third air chamber 130 may be configured to, upon receiving a load applied by collision with an object (e.g., another vehicle), contract while exhausting the deployment gas to the outside from the vent hole to absorb energy caused by the collision.

As illustrated in FIG. 1, in the side view of the vehicle, an upper end of the third air chamber 130 may be disposed to be positioned above an upper end of the door beam 90, in a region from a front end to a rear end of a seating surface of the seat S in the vehicle front-rear direction. Note that such a positional relationship may hold, for example, in the entire region of a front-rear sliding range of the seat S.

The third air chamber 130 may serve as an energy absorption (EA) airbag that generates a uniform load on a contact surface with the outer panel 31 of the front side door 30, in response to load application.

As illustrated in FIG. 1, a front end of the airbag 100 may be positioned to protrude to a vehicle front side further than the front end of the front side door 30.

A rear end of the airbag 100 may be positioned to protrude to a vehicle rear side further than the rear end of the rear side door 40.

Figure 3:
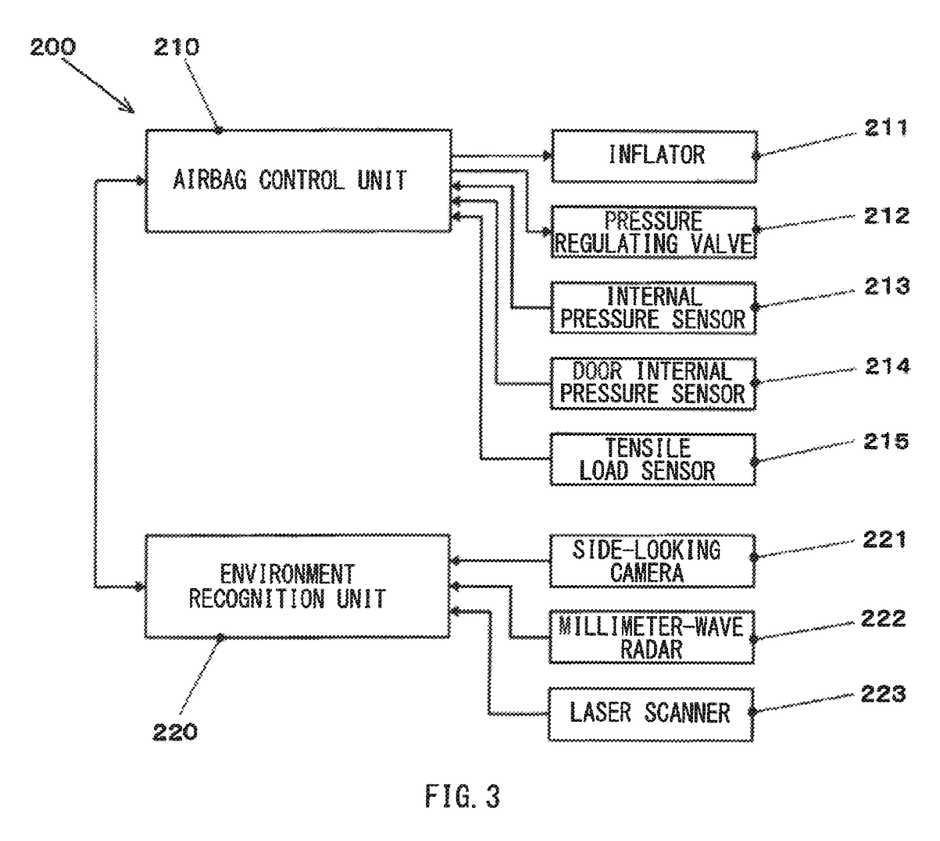
FIG. 3 is a diagram illustrating a configuration of a control system for an airbag in the airbag device according to one example embodiment.

FIG. 3 is a diagram illustrating a configuration of a control system for the airbag in the airbag device according to the first example embodiment.

A control system 200 may include, for example, an airbag control unit 210 and an environment recognition unit 220.

The airbag control unit 210 and the environment recognition unit 220 may each include a microcomputer including, for example, a data processor, a storage, an input/output interface, and a bus. The data processor may be a central processing unit (CPU). The storage may be a random-access memory (RAM) or a read-only memory (ROM). The bus may couple the data processor, the storage, and the input/output interface together.

The airbag control unit 210 and the environment recognition unit 220 may be communicably coupled to each other, for example, directly or via an in-vehicle local area network (LAN) such as a controller area network (CAN) communication system.

The airbag control unit 210 may control a deployment state of the airbag 100.

The airbag control unit 210 may be coupled to, for example, the inflator 211, a pressure regulating valve 212, an internal pressure sensor 213, a door internal pressure sensor 214, and a tensile load sensor 215.

The inflator 211 may be a gas generator that deploys the airbag 100 by supplying the deployment gas to each of the first air chamber 110, the second air chamber 120, and the third air chamber 130 of the airbag 100.

The inflator 211 may be configured to generate the deployment gas, for example, by causing a chemical to react in response to a deployment signal.

The inflator 211 may have a configuration including multiple gas generators that supply the deployment gas independently to the first air chamber 110, the second air chamber 120, and the third air chamber 130 of the airbag 100.

In another example, the inflator 211 may be a multistage inflator that is able to generate the deployment gas multiple times at time intervals, on an as-needed basis.

The pressure regulating valve 212 may be provided in the second air chamber 120, and may open and close an unillustrated vent channel that allows communication between the inside and the outside.

The pressure regulating valve 212 may be configured to, in response to a valve-opening command from the airbag control unit 210, open the vent channel and release the deployment gas inside the second air chamber 120 to the outside to reduce an internal pressure of the second air chamber 120.

The pressure regulating valve 212 may cooperate with the airbag control unit 210 to serve as an "internal pressure controller" in one embodiment.

The pressure regulating valve 212 may be in a closed state in a period from start of deployment of the airbag 100 until before collision.

The internal pressure sensor 213 may be a pressure sensor that detects the pressure (i.e., internal pressure) of the deployment gas inside the second air chamber 120.

The door internal pressure sensor 214 may detect an air pressure in the space between the outer panel 31 and the inner panel 32 of the front side door 30, i.e., a pressure inside the door.

The door internal pressure sensor 214 may serve as an application state detector that detects a load application state from the airbag 100 to the vehicle body, by detecting a change in air pressure caused by crush of the front side door 30 upon a side collision.

The pressure inside the door may increase with an increase in an amount of deformation of the front side door 30, Accordingly, the door internal pressure sensor 214 may be used as a deformation amount detector that detects the amount of deformation of the front side door 30.

The tensile load sensor 215 may detect a tensile load that acts between the second air chamber 120 and the retainer 51.

The tensile load sensor 215 may include, for example, a load sensor such as a load cell.

If the first air chamber 110 collides with an object to be pushed to the vehicle-widthwise inside while deforming the front side door 30, an upper part of the second air chamber 120 may be pulled by the lower part of the first air chamber 110, and a tensile load may thus act on the second air chamber 120.

On the basis of the tensile load, it is possible to detect the load application state from the airbag 100 to the vehicle body.

The tensile load sensor 215 may also serve as the application state detector and as the deformation amount detector.

The environment recognition unit 220 may recognize a surrounding environment including a side of the vehicle 1, i.e., the own vehicle, on the basis of outputs of various sensors.

The environment recognition unit 220 may be coupled to the sensors, for example, a side-looking camera 221, a millimeter-wave radar 222, and a laser scanner 223.

The side-looking camera 221 may include, for example, a solid-state image sensor such as a complementary metal oxide semiconductor (CMOS) or a charge-coupled device (CCD), an imaging optical system such as a lens group, and an image processor. The side-looking camera 221 may sequentially acquire images within an imaging range, i.e., an angle of view, including the side of the own vehicle.

The millimeter-wave radar 222 may be a radar that uses radio waves in a frequency band of, for example, 30 to 300 GHz. The millimeter-wave radar 222 may be configured to detect presence or absence of an object and a relative position of the object with respect to the vehicle 1.

The laser scanner 223 may be a light detection and ranging (LiDAR). The laser scanner 223 may be configured to irradiate surroundings of the vehicle 1 with, for example, pulsed near-infrared laser light to scan the surroundings. The laser scanner 223 may thereby detect, for example, presence or absence of an object, a relative position of the object with respect to the vehicle 1, and a shape of the object, on the basis of presence or absence of reflected light and a time difference between irradiation with the laser light and returning of reflected light.

Figure 4:
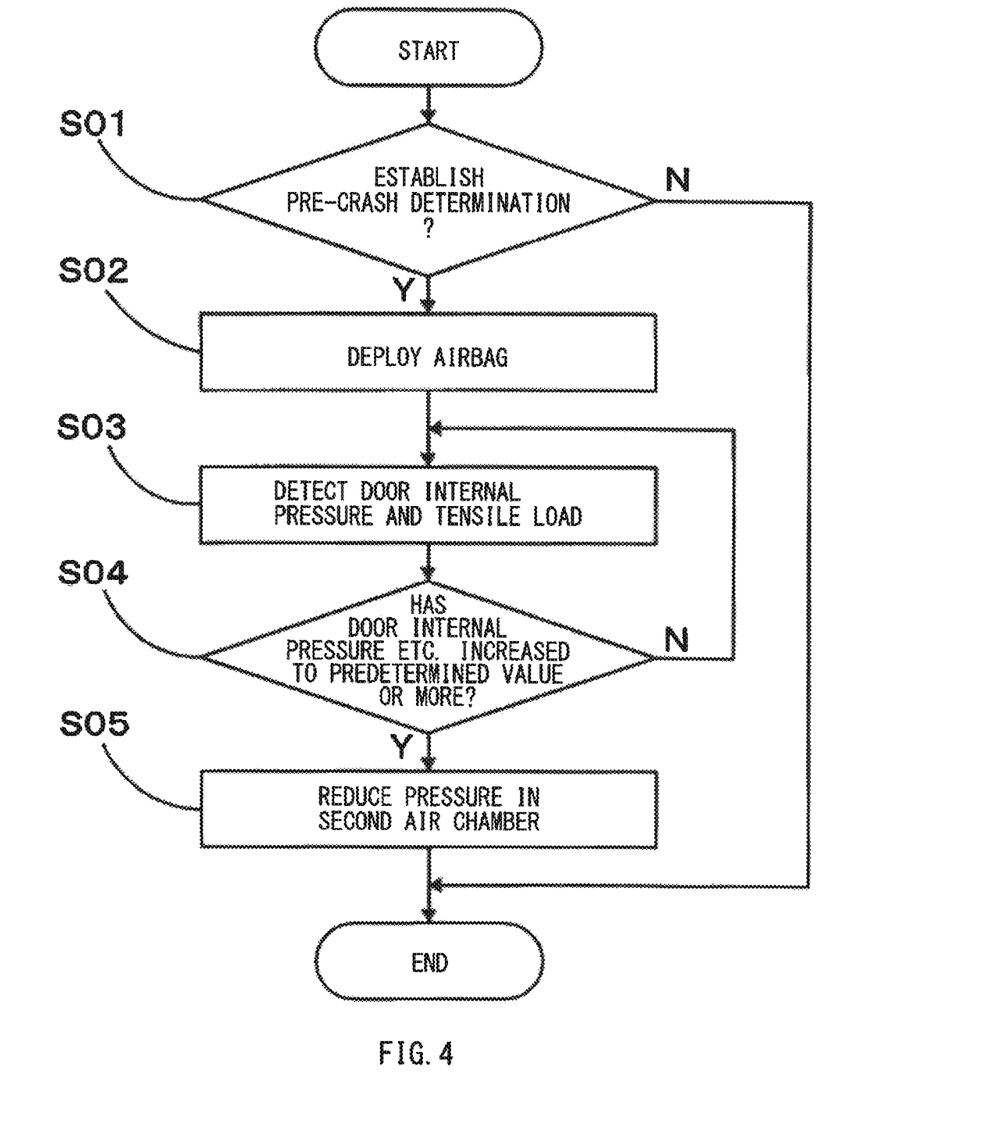
FIG. 4 is a flowchart illustrating an overview of airbag deployment control in the airbag device according to one example embodiment.

For example, in a case where a side collision with an object such as another vehicle V is unavoidable, i.e., a case where pre-crash determination is established, the environment recognition unit 220 may be able to recognize a form of the collision with the object and an attribute of the object. The form of the collision with the object may be, for example, a speed vector of the object with respect to the vehicle 1 or a position where the object collides with the vehicle 1. The attribute of the object may be, for example, a vehicle type, a vehicle shape, or a size in a case where the object is a vehicle, FIG. 4 is a flowchart illustrating an overview of airbag deployment control in the airbag device according to the first example embodiment.

The flow is described below in order of step.

[Step S01: Pre-crash Determination Establishment]

The environment recognition unit 220 may determine, on the basis of the outputs of the sensors, whether collision of an object such as the other vehicle V on a side surface of the vehicle 1 is unavoidable.

If the environment recognition unit 220 determines that collision is unavoidable (step S01: Y), the environment recognition unit 220 may establish pre-crash determination, and the flow may proceed to step S02. Otherwise (step S01: N), the series of processes may be ended.

[Step S02: Airbag Deployment]

The environment recognition unit 220 may transmit a signal indicating that the pre-crash determination has been established to the airbag control unit 210.

The airbag control unit 210 may supply the deployment signal to the inflator 211, and the inflator 211 may start to generate the deployment gas.

The airbag 100 may thus be fed to the outside from the retainer 51 and start to be deployed, finally being deployed into a shape illustrated in FIG. 2.

Thereafter, the flow may proceed to step S03.

[Step S03: Detection of Door Internal Pressure and Tensile Load]

The airbag control unit 210 may detect the pressure inside the door and the tensile load on the second air chamber 120, with the use of the door internal pressure sensor 214 and the tensile load sensor 215.

Thereafter, the flow may proceed to step S04.

[Step S04: Determination of Increase in Door Internal Pressure etc.]

The airbag control unit 210 may determine whether one or both of the pressure inside the door and the tensile load on the second air chamber 120 detected in step S03 has increased to a preset threshold or more.

If one or both of the pressure and the tensile load becomes the threshold or more (step S04: Y), the flow may proceed to step S05. Otherwise (step S04: N), the flow may return to step S03, and the subsequent processes may be repeated.

[Step S05: Pressure Reduction in Second Air Chamber]

The airbag control unit 210 may release a portion of the deployment gas to the outside from the inside of the second air chamber 120, by temporarily putting the pressure regulating valve 212 into an open state and thereafter returning the pressure regulating valve 212 to a closed state, to reduce the internal pressure of the second air chamber 120 to a predetermined post-collision internal pressure lower than a during-deployment internal pressure.

At this time, the airbag control unit 210 may perform feedback control on the pressure regulating valve 212 on the basis of the output of the internal pressure sensor 213.

Figure 5:
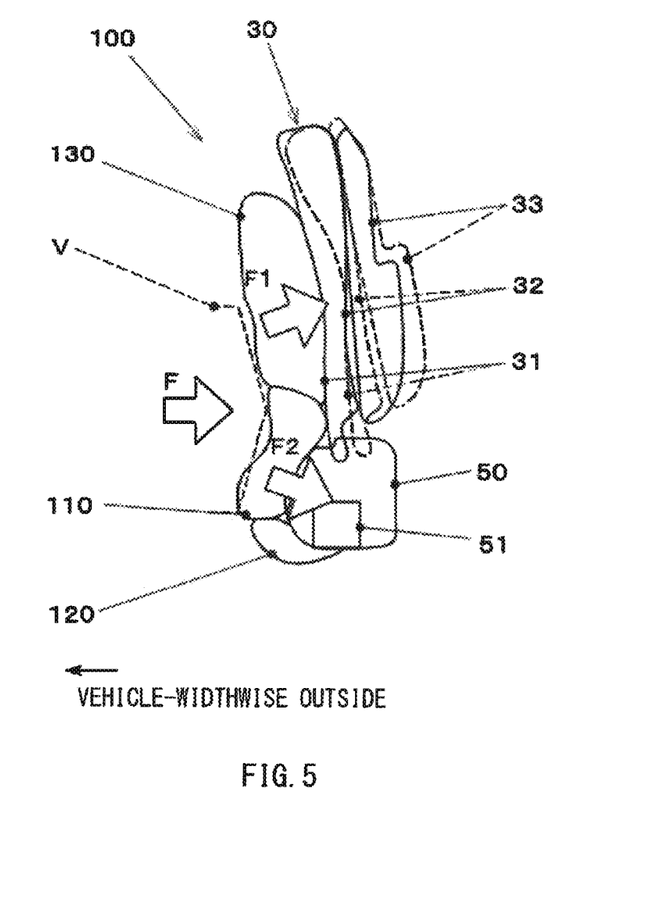
FIG. 5 is a cross-sectional view of a state after a side collision in the vehicle including the airbag device according to one example embodiment.

Thereafter, the series of processes may be ended and the flow may return,

FIG. 5 is a cross-sectional view of a state after a side collision in the vehicle including the airbag device according to the first example embodiment.

In FIG. 5, a solid line indicates, for example, the front side door 30 and the airbag 100 after the collision in the first example embodiment, and a dashed line indicates, for example, the front side door 30 after the collision assumed in a case where the airbag 100 is not provided.

As illustrated in FIG. 5, in the first example embodiment, a load F applied upon a side collision with an object such as the other vehicle V may be transmitted to the vehicle body in a distributed manner as a load F1 on the front side door 30 and a load F2 on the side sill 50. This makes it possible to reduce the load F1 transmitted to the front side door 30, making it possible to reduce the amount of deformation of the front side door 30 and an amount of movement of the front side door 30 to the inside of the vehicle compartment, as compared with the assumed case where the airbag 100 described above is not provided.

For example, it is possible to suppress displacement of a lower end of the front side door 30 to the vehicle-widthwise inside beyond the side sill 50.

According to the first example embodiment described above, it is possible to achieve the following example effects.

(1) The first air chamber 110 of the airbag 100 transmits a load applied from the vehicle-widthwise outside to the side surface of the side sill 50 upon a side collision of the vehicle 1. This makes it possible to suppress deformation of the front side door 30 entering the inside of the vehicle compartment 10, making it possible to suppress damage to an occupant.

In addition, the internal pressure of the second air chamber 120 coupling the first air chamber 110 and the side sill 50 is controlled depending on the load application state from the airbag 100 to the vehicle body. This makes it possible to control a behavior of the airbag 100 to allow the first air chamber 110 to reliably transmit the load to the side sill 50, which helps to more effectively achieve the example effects described above.

(2) It is possible to absorb collision energy applied above the first air chamber 110 upon the collision with the object by contraction of the third air chamber 130, making it possible to suppress deformation of the front side door 30 above the first air chamber 110.

(3) The internal pressure of the second air chamber 120 may be reduced on the basis of the output of the door internal pressure sensor 214 that detects the amount of deformation of the front side door 30. Thus, in a case where load transmission from the first air chamber 110 to the front side door 30 is started and the amount of deformation of the front side door 30 increases, it is possible to reduce the internal pressure of the second air chamber 120 to promote deformation of the airbag 100 to wrap around the side sill 50, to cause the first air chamber 110 to transmit a load diagonally downward to the side sill 50. This promotes the load transmission to the side sill 50, making it possible to suppress the amount of deformation of the front side door 30.

Second Example Embodiment

A description is given next of an airbag device according to a second example embodiment of the disclosure.

In the second example embodiment, portions common to those in the first example embodiment described above are denoted with the same reference numerals to avoid repetitive description, and differences will mainly be described.

Figure 6:
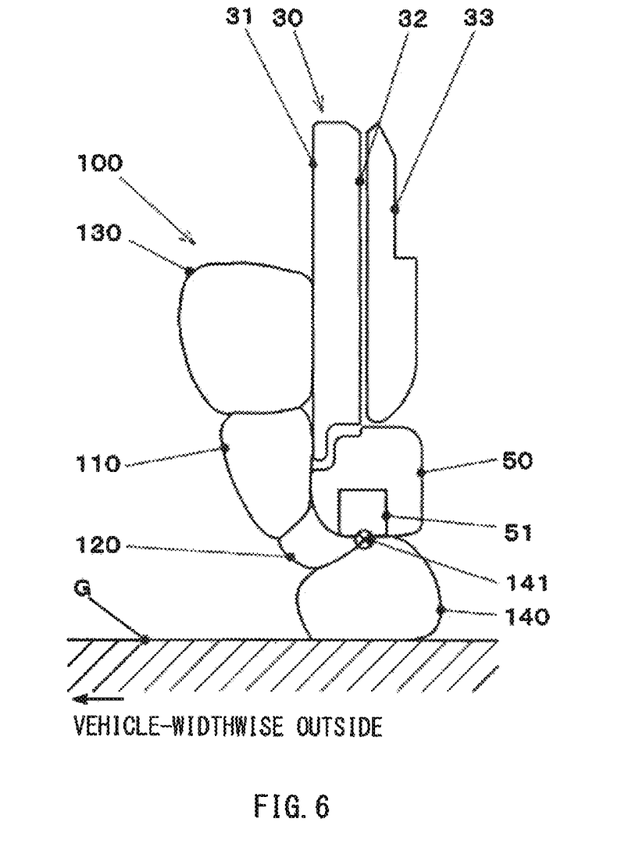
FIG. 6 is a cross-sectional view of surroundings of a front side door in a vehicle including an airbag device according to one example embodiment of the disclosure.

FIG. 6 is a cross-sectional view of surroundings of the front side door in the vehicle including the airbag device according to the second example embodiment of the disclosure.

As illustrated in FIG. 6, in the second example embodiment, the airbag 100 may further include a buffer air chamber 140.

The buffer air chamber 140 may be deployed in a state of being held between the lower part of the side sill 50 and a road surface G, in a region on the vehicle-widthwise inside with respect to the second air chamber 120.

The buffer air chamber 140 may be provided with a control valve 141.

The control valve 141 may be configured to, in response to a command from the airbag control unit 210, switch between an open state that allows communication between the buffer air chamber 140 and the second air chamber 120 and a closed state that blocks the communication.

The control valve 141 may cooperate with the airbag control unit 210 to serve as a "communication controller" in one embodiment.

In response to establishment of pre-crash determination, the buffer air chamber 140 may receive the deployment gas supplied from the inflator 211 to be deployed at the same time as the first air chamber 110, the second air chamber 120, and the third air chamber 130.

When deployment is completed, an internal pressure of the buffer air chamber 140 may be set to be a lower pressure than the internal pressure of the second air chamber 120.

In the second example embodiment, pressure reduction in the second air chamber 120 after collision may be performed by opening the control valve 141 and moving a portion of the deployment gas inside the second air chamber 120 to the buffer air chamber 140.

According to the second example embodiment described above, it is possible to achieve example effects similar to those of the first example embodiment described above. In addition, even in a case where a load including a downward component is applied to, for example, the first air chamber 110 and the second air chamber 120 of the airbag 100 upon collision with an object, the buffer air chamber 140 is able to suppress downward displacement of a member such as the first air chamber 110 by using reaction force applied from the road surface G, making it possible to further stabilize load transmission to a member such as the side sill 50.

In addition, the control valve 141 may control a communication state between the second air chamber 120 and the buffer air chamber 140. This makes it possible to control the internal pressure of the second air chamber 120 with the use of a simple configuration.

Third Example Embodiment

A description is given next of an airbag device according to a third example embodiment of the disclosure.

Figure 7:
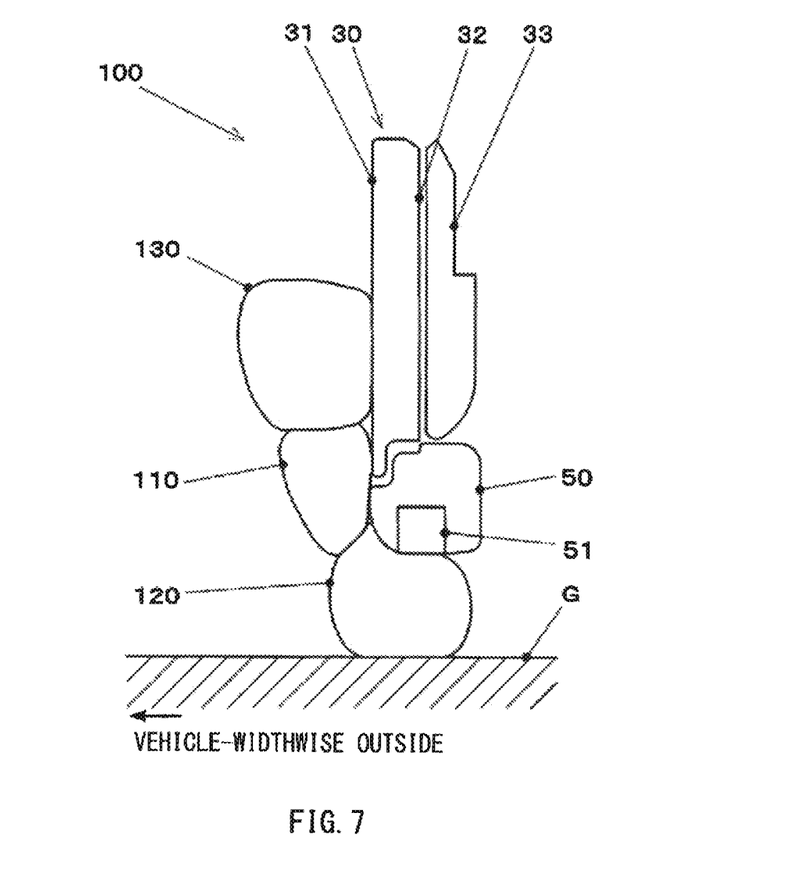
FIG. 7 is a cross-sectional view of surroundings of a front side door in a vehicle including an airbag device according to one example embodiment of the disclosure.

FIG. 7 is a cross-sectional view of surroundings of the front side door in the vehicle including the airbag device according to the third example embodiment of the disclosure.

In the third example embodiment, the second air chamber 120 may be configured to be deployed in a state in which its underside comes into contact with the road surface G.

Also in the third example embodiment, it is possible to achieve example effects similar to those of the first and second example embodiments described above.

It is also possible to simplify a device configuration as compared with the configuration according to the second example embodiment.

Fourth Example Embodiment

A description is given next of an airbag device according to a fourth example embodiment of the disclosure.

The airbag device according to the fourth example embodiment may include an unillustrated application direction sensor.

The application direction sensor may be provided within the space between the outer panel 31 and the inner panel 32 of the front side door 30, in a region overlapping with the first air chamber 110 of the airbag 100 as viewed in the vehicle widthwise direction.

The application direction sensor may be configured to detect an application direction of a load from the first air chamber 110 to the front side door 30, for example, a downward component of the load.

In the airbag device according to the fourth example embodiment, after deployment of the airbag 100, pressure reduction in the second air chamber 120 may be performed in response to an increase in the downward component of the load detected by the application direction sensor.

According to the fourth example embodiment described above, pressure may be reduced in the second air chamber 120 in response to an increase in the downward component of the load transmitted from the first air chamber 110, for example, to the front side door 30. This makes it possible to reduce the internal pressure of the second air chamber 120 in response to start of load transmission from the first air chamber 110 to the side sill 50. This prevents inhibition of a behavior of the first air chamber 110 pressing the side sill 50 from a diagonal upper side, making it possible to further promote load transmission from the airbag 100 to the side sill 50.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) Configurations of the airbag device and the vehicle may be changed as appropriate, without being limited to the example embodiments described above.

For example, shapes, structures, materials, manufacturing methods, numbers, arrangements, etc. of the members included in the airbag device and the vehicle may be changed as appropriate.

(2) A configuration of the airbag, an arrangement of the air chambers, etc. may be changed as appropriate, without being limited to the configurations according to the example embodiments. For example, the third air chamber may be omitted in a case where energy absorption at an upper part of the door is possible by another method. Another air chamber may be additionally provided in addition to the air chambers described above. Each air chamber may be further divided.

(3) A method of detecting a symptom of collision may be changed as appropriate without being limited to the method using the sensors in the example embodiments. For example, another type of sensor may be used in addition to or in place of the sensors in the example embodiments. In another example, a symptom of collision may be detected by inter-vehicle communication or road-to-vehicle communication.

(4) In the example embodiments, the container, e.g., the retainer 51, that contains the undeployed airbag 100 may be provided inside the lower part of the side sill 50, However, a place where the container is provided may be changed as appropriate, without being limited thereto. For example, the container may be provided on an underside of the floor panel, or inside a side step, which is an aerodynamic part with design provided on the side sill.

(5) Although the example embodiments describe the example effects related to suppression of deformation of the front side door, similar example effects are achievable also in relation to suppression of deformation of the rear side door.

Although the example embodiments describe, as an example, the vehicle including the front side door and the rear side door, the disclosure may also be applied to a vehicle including only one door on each side surface of the vehicle body.

As described above, according to at least one embodiment of the disclosure, it is possible to provide an airbag device that suppresses collision damage upon a side collision.

Each of the airbag control unit 210 and the environment recognition unit 220 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the airbag control unit 210 and the environment recognition unit 220. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of The airbag control unit 210 and the environment recognition unit 220 illustrated in FIG. 3.

The invention claimed is:

1. An airbag device to be applied to a vehicle, the vehicle being provided with
a door provided to be openable and closable at a door opening provided on a side surface of a vehicle body of the vehicle, and
a side sill disposed along a lower edge of the door, the airbag device comprising:

an airbag configured to be deployed from a container to be disposed on a lower side of the door on the vehicle body to a region on a vehicle-widthwise outside of the door; and
a pressure sensor configured to detect an air pressure in a space between an outer panel and an inner panel of the door, wherein
the airbag comprises
a first air chamber configured to transmit a load applied from the vehicle-widthwise outside to a side surface of the side sill,
a second air chamber configured to couple, across a lower part of the first air chamber and the container and below the first air chamber,
a valve provided at a vent channel that allows communication between an inside of the second air chamber and an outside of the second air chamber, and
an internal pressure controller configured to:
close the valve at a start of deployment of the airbag;
determine, after the start of deployment of the airbag, whether the detected air pressure is equal to or higher than a preset threshold value; and
in response to a determining that the detected air pressure is equal to or higher than the preset threshold value, open the valve.

2. The airbag device according to claim 1, wherein airbag further comprises a third air chamber configured to, after being deployed, protrude above an upper end of the first air chamber.

3. The airbag device according to claim 2, further comprising an internal pressure sensor configured to detect an internal pressure of the second air chamber,
wherein the internal pressure controller is configured to:
determine, after an opening of the valve, whether the detected internal pressure of the second air chamber is lower than a predetermined internal pressure, a value of the predetermined internal pressure being lower than the preset threshold value; and
in response to a determining that the detected internal pressure of the second air chamber is lower than the predetermined internal pressure, close the valve.

4. The airbag device according to claim 3,
wherein a first vertical distance from a first point where the second air chamber and the container are fixed to each other to a second point where a side surface of the side sill protrudes furthest to the vehicle-widthwise outside is set equal to a second vertical distance from the second point to the upper end of the first air chamber.

5. The airbag device according to claim 4,
wherein the air bag further comprises a buffer chamber that communicates with the second air chamber via the vent channel and is configured to deploy between a lower part of the side sill and a road surface.

6. The airbag device according to claim 2,
wherein a first vertical distance from a first point where the second air chamber and the container are fixed to each other to a second point where a side surface of the side sill protrudes furthest to the vehicle-widthwise outside is set equal to a second vertical distance from the second point to the upper end of the first air chamber.

7. The airbag device according to claim 6,
wherein the air bag further comprises a buffer chamber that communicates with the second air chamber via the vent channel and is configured to deploy between a lower part of the side sill and a road surface.

8. The airbag device according to claim 1, further comprising an internal pressure sensor configured to detect an internal pressure of the second air chamber,
wherein the internal pressure controller is configured to:
determine, after an opening of the valve, whether the detected internal pressure of the second air chamber is lower than a predetermined internal pressure, a value of the predetermined internal pressure being lower than the preset threshold value; and
in response to a determining that the detected internal pressure of the second air chamber is lower than the predetermined internal pressure, close the valve.

9. An airbag device to be applied to a vehicle, the vehicle being provided with
a door provided to be openable and closable at a door opening provided on a side surface of a vehicle body of the vehicle, and
a side sill disposed along a lower edge of the door, the airbag device comprising:
an airbag configured to be deployed from a container to be disposed on a lower side of the door on the vehicle body to a region on a vehicle-widthwise outside of the door; and
a load sensor configured to detect a tensile load that acts between the second air chamber and the container, wherein
the airbag comprises
a first air chamber configured to transmit a load applied from the vehicle-widthwise outside to a side surface of the side sill,
a second air chamber configured to couple, across a lower part of the first air chamber and the container and below the first air chamber,
a valve provided at a vent channel that allows communication between an inside of the second air chamber and an outside of the second air chamber, and
an internal pressure controller configured to:
close the valve at a start of deployment of the airbag;
determine whether the detected load is equal to or higher than a preset threshold value after the start of deployment of the airbag; and
in response to a determining that the detected load is equal to or higher than the preset threshold value, open the valve.

10. The airbag device according to claim 9, wherein the airbag further comprises a third air chamber configured to, after being deployed, protrude above an upper end of the first air chamber.

11. The airbag device according to claim 10, further comprising an internal pressure sensor configured to detect an internal pressure of the second air chamber,
wherein the internal pressure controller is configured to:
determine, after an opening of the valve, whether the detected internal pressure of the second air chamber is lower than a predetermined internal pressure; and
in response to a determining that the detected internal pressure of the second air chamber is lower than the predetermined internal pressure, close the valve.

12. The airbag device according to claim 11,
wherein a first vertical distance from a first point where the second air chamber and the container are fixed to each other to a second point where a side surface of the side sill protrudes furthest to the vehicle-widthwise outside is set equal to a second vertical distance from the second point to the upper end of the first air chamber.

13. The airbag device according to claim 12, wherein the air bag further comprises a buffer chamber that communicates with the second air chamber via the vent channel and is configured to deploy between a lower part of the side sill and a road surface.

14. The airbag device according to claim 10,
   wherein a first vertical distance from a first point where the second air chamber and the container are fixed to each other to a second point where a side surface of the side sill protrudes furthest to the vehicle-widthwise outside is set equal to a second vertical distance from the second point to the upper end of the first air chamber.

15. The airbag device according to claim 14,
   wherein the air bag further comprises a buffer chamber that communicates with the second air chamber via the vent channel and is configured to deploy between a lower part of the side sill and a road surface.

16. The airbag device according to claim 9, further comprising an internal pressure sensor configured to detect an internal pressure of the second air chamber,
   wherein the internal pressure controller is configured to:
      determine, after an opening of the valve, whether the detected internal pressure of the second air chamber is lower than a predetermined internal pressure; and
      in response to a determining that the detected internal pressure of the second air chamber is lower than the predetermined internal pressure, close the valve.

\* \* \* \* \*